(12) United States Patent
Campbell et al.

(10) Patent No.: US 8,370,807 B2
(45) Date of Patent: Feb. 5, 2013

(54) DEBUGGING FOR RUNTIME TYPE SYSTEMS

(75) Inventors: Dustin Campbell, Bellevue, WA (US); Sreekar Choudhary, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 12/402,778

(22) Filed: Mar. 12, 2009

(65) Prior Publication Data
US 2010/0235810 A1   Sep. 16, 2010

(51) Int. Cl.
G06F 9/44   (2006.01)
(52) U.S. Cl. .......... 717/124; 717/106; 717/131
(58) Field of Classification Search .......... 717/106, 717/124
See application file for complete search history.

(56) References Cited

U.S. PATENT DOCUMENTS

| | | | |
|---|---|---|---|
| 6,158,045 A * | 12/2000 | You | 717/124 |
| 6,629,123 B1 * | 9/2003 | Hunt | 717/106 |
| 6,795,963 B1 | 9/2004 | Andersen et al. | |
| 6,826,746 B2 * | 11/2004 | Evans et al. | 717/124 |
| 6,957,422 B2 * | 10/2005 | Hunt | 717/131 |
| 7,162,664 B2 | 1/2007 | Haselden et al. | |
| 7,287,246 B2 | 10/2007 | Tan et al. | |
| 7,634,761 B2 * | 12/2009 | Buschardt et al. | 717/129 |
| 2002/0129337 A1 * | 9/2002 | Evans et al. | 717/124 |
| 2004/0205702 A1 | 10/2004 | Logan et al. | |
| 2004/0230954 A1 | 11/2004 | Dandoy | |
| 2005/0183090 A1 * | 8/2005 | Hunt | 717/131 |
| 2006/0064677 A1 | 3/2006 | Bickson et al. | |
| 2007/0150855 A1 * | 6/2007 | Jeong | 717/106 |
| 2007/0169040 A1 * | 7/2007 | Chen | 717/124 |
| 2008/0168428 A1 * | 7/2008 | Bates et al. | 717/129 |
| 2008/0244243 A1 | 10/2008 | Kalra | |
| 2009/0183142 A1 * | 7/2009 | Hoban et al. | 717/124 |

OTHER PUBLICATIONS

Bruno De Fraine, StrongAspectJ: Flexible and Safe Pointcut/Advice Bindings, ACM, 2008, 12 pages, <URL: http://delivery.acm.org/10.1145/1360000/1353491/p60-de_fraine.pdf>.*
Juan Chen, A Simple Typed Intermediate Language for Object-Oriented Languages, ACM, 2005, 12 pages, <URL: http://delivery.acm.org/10.1145/1050000/1040309/p38-chen.pdf>.*
Robert Bocchino, A Type and Effect System for Deterministic Parallel Jave, ACM, 2009, 20 pages, <URL: http://delivery.acm.org/10.1145/1650000/1640097/p97-bocchino.pdf>.*
Peter Sewell, Acute: High-Level Programming Language Design for Distributed Computation, ACM, 2006, 12 pages, <URL: http://delivery.acm.org/10.1145/1090000/1086370/p15-sewell.pdf>.*
Alexey Loginov, Debugging via Run-Time Type Checking, 2001, Google Scholar, 16 pages, <URL: http://www.springerlink.com/content/tldy4a7y5122bc1m/fulltext.pdf>.*

(Continued)

Primary Examiner — Thuy Dao
Assistant Examiner — Hua Lu
(74) Attorney, Agent, or Firm — Ogilvie Law Firm

(57) ABSTRACT

Debugging tools are provided for program objects in dynamically typed programming languages. Some dynamic objects have both static type members and dynamic type members. Some dynamic objects implement an IDynamicObject interface, and some include a COM object. A list of dynamic object members is obtained from a dynamic language runtime. Member values are then obtained, and displayed in the debugger. Properties can be added to a dynamic object in the debugger. Code can be generated during debugging to make a user call to a method of the dynamic object, to evaluate a property of the dynamic object, and/or to forward a behavior of an operator to the dynamic type of the dynamic object. In some embodiments a dynamic language runtime operates with the debugger.

20 Claims, 6 Drawing Sheets

OTHER PUBLICATIONS

Welf Lowe, Understanding Software—Static and Dynamic Aspects, 2001, Google Scholar, 6 pages, <URL: http://www.arisa.se/files/LLS-01.pdf>.*

Johnson, Stephen Lee., "Teabag: A Debugger for Curry", A thesis submitted in partial fulfillment of the requirements for the degree of Master of Science in Computer Science, Portland State University, retrieved at <<http://www.cs.pdx.edu/pdfs/johnsonThesis2004.pdf>>, Jul. 2, 2004, pp. 1-183.

Lencevicius, Raimondas., "On-the-fly Query-based Debugging with Examples", Proceedings of the fourth International Workshop on Automated Debugging, 2000, retrieved at <<http://arxiv.org/ftp/cs/papers/0011/0011021.pdf>>, Aug. 28-30, 2000, pp. 1-14.

Czyz, Jeffrey., "Query-based Debugging and Visualization in JIVE", retrieved at <<http://www.eclipsecon.org/2008/?page=sub/&id=444>>, Jan. 19, 2009, pp. 1-4.

Dreijer, Soren., "For-loops and the Visual Studio debugger", retrieved at http://inside.echobit.net/dreijer/archives/2008/10/07/for-loops-and-the-visual-studio-debugger/, Oct. 7, 2008, pp. 1-5.

* cited by examiner

| y,dynamic | Expanding the Dynamic View will get |
|---|---|
| __dict__ | {IronPython.Runtime.PythonDictionar {IronPython.Runtime.Pyth |
| __module__ | "__builtin__" {System.String} |
| class_val | 5 {System.Int32} |
| some_meth | {IronPython.Runtime.Method} {IronPython.Runtime.Met |
| inst_val | 3 {System.Int32} |
| Name | "Sree" {System.String} |

Fig. 5

```
class z(object):
    class_val = 65;
class x(object):
    class_val = 5
    def meth1(self): pass
    def meth2(self, obj):
        return obj
    array = [2, 3, 4, 56, 78]
a = x()",SourceCodeKind.Statements);
```

| Watch1 | | |
|---|---|---|
| Name | Value | Type |
| y.meth2("Ha | "Ha ha ha" | ::dynamic{string} |
| y.array[2] | 4 | ::dynamic{int} |
| y.array | {IronPython.Runtime.List} | ::dynamic{IronPython.Ru |
| Count | 5 | ::dynamic{int} |
| Non-Public | {IronPython.Runtime.List} | ::dynamic{IronPython.Ru |
| y.class_val=10 | 10 | ::dynamic{int} |
| y.class_val | 10 | ::dynamic{int} |

Fig. 7

DEBUGGING FOR RUNTIME TYPE SYSTEMS

BACKGROUND

Data types in computer programming languages help give meaning to the bits that represent values in computer systems. Limiting program values to particular data types also helps programmers detect and avoid some errors. Some programming environments support static typing, in which a compiler or similar tool checks variable uses against variable type declarations at compile-time, that is, at the time when a program's source code is being translated into executable code. Some of the many programming languages which use static typing include Ada, Basic, C#, COBOL, FORTRAN, Java™ (mark of Sun Microsystems, Inc.), and Pascal, to name just a few. Some programming environments support dynamic typing, in which type-checking is performed at runtime (during program execution) rather than compile-time. Some of the programming languages which use dynamic typing include JavaScript™ (mark of Sun Microsystems, Inc.), Lisp, Prolog, Python, and Ruby, for example.

SUMMARY

Debugging in some programming environments is difficult because objects in dynamically typed programming languages do not have strong types that represent the members the objects contain, and the runtime type of such objects does not contain helpful information, e.g., member names and values. Some embodiments described herein facilitate software development by identifying within a debugger a static type associated with a dynamic object, and a dynamic type which is also associated with the dynamic object. The dynamic object may have inspectable member(s); for example, some dynamic objects implement an IDynamicObject interface, and some include a COM object which lacks static type information. A list of dynamic object members is obtained from a dynamic language runtime. Member values are then obtained, and displayed in the debugger. Dynamic member values may be made stale in the debugger, and may later be temporarily or permanently removed from staleness.

In some embodiments, properties can be added to a dynamic object in the debugger. In some embodiments, code can be generated during debugging to perform operations such as making a user call to a method of the dynamic object, evaluating a property of the dynamic object, and/or forwarding a behavior of an operator to the dynamic type of the dynamic object. In some embodiments a dynamic language runtime operates with the debugger. The dynamic language runtime includes methods to provide property names, property values, field names, and field values, if any, of the dynamic object. The dynamic language runtime also includes a method to list names and methods, if any, of dynamic object properties which require argument(s) in invocation(s) for obtaining respective property values and method values.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 is a sample screen shot illustrating a debugger "dynamic" format specifier;

FIG. 7 is a sample screen shot illustrating evaluation of dynamic object property getters within a debugger window.

DETAILED DESCRIPTION

Overview

Figure 1:
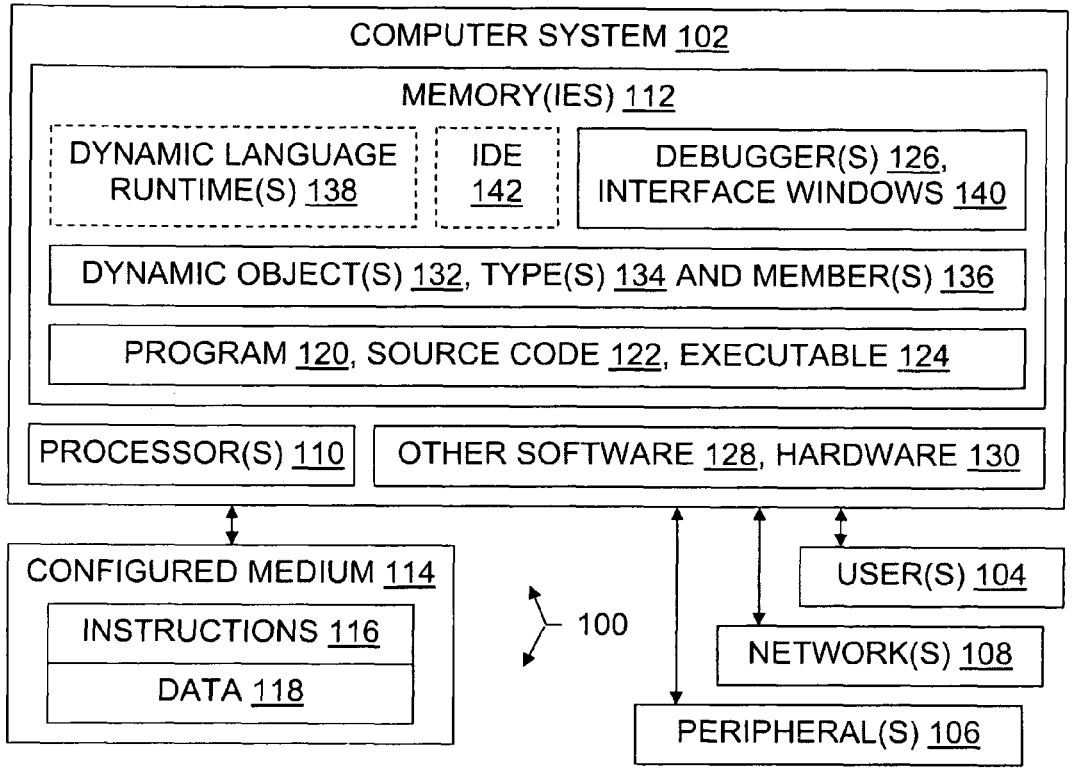
FIG. 1 is a block diagram illustrating a computer system having at least one processor, at least one memory, at least one debugger for debugging applications, and other items in an operating environment which may be present on multiple network nodes, and also illustrating configured storage medium embodiments.

Currently, objects in dynamic languages such as IronRuby or IronPython do not have strong types that represent the members they contain. Nor does the runtime type of the object contain any useful information that can be consumed by the user during debugging. The debugger has no option other than to display the internal machinery of the object. Thus, users cannot readily inspect the object and find the object's members and their values. In addition, because the IntelliSense® tool (mark of Microsoft Corporation) does not show any of the dynamic members, debugging can be hampered by an inability to query the state of the object while stepping though code.

To improve the debugging experience for the user when inspecting dynamic objects, in some embodiments a C# expression evaluator queries dynamic objects to determine if they have an alternate type system hidden beneath them, e.g., to determine whether they implement the IDynamicObject interface or are COM objects. When such an object is found, the expression evaluator will create a child under the object's node in the Locals, Autos and Watch debugging windows; this child node is called the Dynamic View. This dynamic view will enumerate the members of the object from the alternate type system and then get each of their values. This enumeration and valuation is done by calling the runtime system to find the underlying type representation (e.g., MetaObject or COM type lib) and then using that representation.

By dynamically querying the object at runtime, the debugger can show a dynamic view of the object which provides the user with a better experience. In addition, this solution allows the users to interact with dynamic objects during debugging, by calling methods, writing expressions using operators, and so on. The mechanisms may be used to embrace other alternate type systems, such as COM.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor") is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Alternate type system" means any data type system which is not fully determined at compile-time. Some examples of alternate type systems include IDynamicObject implementations, COM objects which are not fully statically typed, and dynamic objects in languages such as Python, Ruby, and others.

"Code" means processor instructions, data (which includes constants, variables, and data structures), or both instructions and data.

Throughout this document, use of the optional plural "(s)" means that one or more of the indicated feature is present. For example, "member(s)" means "one or more members" or equivalently "at least one member".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable") is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by adding properties, making user calls to dynamic methods, evaluating dynamic object properties, forwarding behavior to a dynamic type, making a value stale/non-stale, displaying values in a debugger window, utilizing a dynamic language runtime, generating code, and/or other operations.

Memories 112 may be of different physical types. A program 120 having source code 122 and an executable 124, a debugger 126, other software 128, and other items shown in the Figures may reside partially or entirely within one or more memories 112, thereby configuring those memories. Some debuggers have a command line or other text-only interface, but many debuggers have a user interface which includes graphical windows 140. An operating environment may also include other hardware 130, such as buses, power supplies, and accelerators, for instance.

Some programs 120 include dynamic object(s) 132, which have corresponding type(s) 134 and member(s) 136. A dynamic object may have both static member(s) 136 and dynamic member(s) 136, or the dynamic object may have only dynamic member(s) 136, for example. Dynamic member(s) have types 134 and member(s) 136 which are determined at least partially at runtime, using for example a dynamic language runtime 138.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use dynamic objects.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
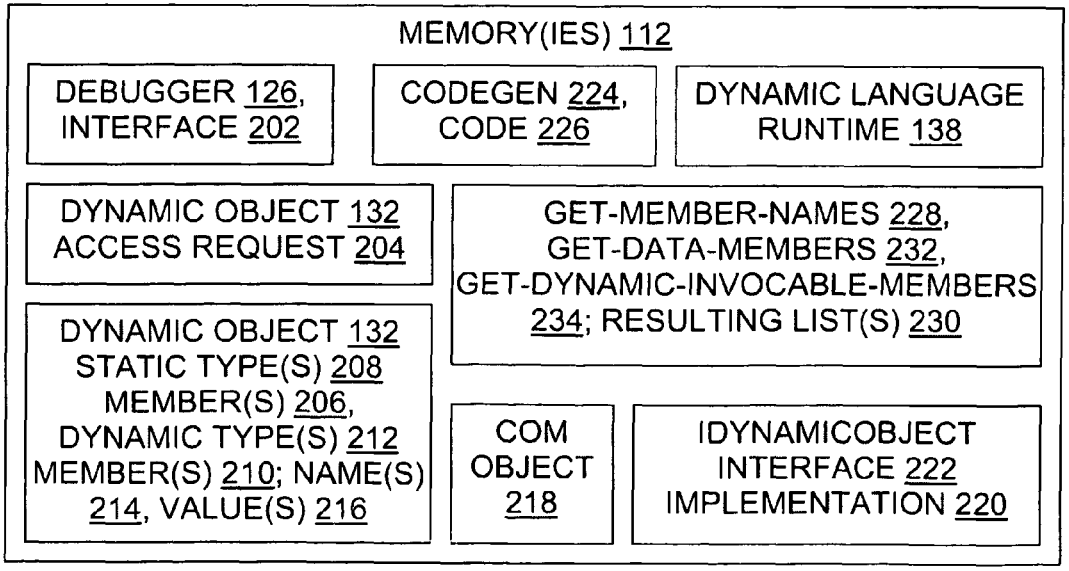
FIG. 2 is a block diagram further illustrating an architecture containing a debugger, a dynamic language runtime, and dynamic objects of an application that is being debugged.

FIG. 2 illustrates an architecture which is suitable for use with some embodiments. A debugger 126 includes an interface 202, which may include a graphical user interface, and/or a programmatic interface such as an API or command interpreter, for example. The interface 202 can receive an access request 204 which requests some form of access to a dynamic object 132 of a program 120 that is being debugged in the debugger 126. Familiarity with a debugger, and the ability to access (and add if necessary) features supporting debugging for runtime type systems, is presumed in some embodiments. The dynamic object 132 may have static members 206, namely, members 136 which have static types 208 as their data types 134. The dynamic object 132 may have dynamic members 210, namely, members 136 which have dynamic types 212 as their data types 134. Static members 206 and dynamic members 210 have names 214 and values 216.

Dynamic objects 132 may include COM objects 218 and/or implementations 220 of an IDynamicObject interface 222, for example.

In order to respond to an access request 204, some debugger embodiments use a lightweight codegen 224 to generate code 226 which transforms the access request 204 into a form utilizing features of a dynamic language runtime 138 embodiment. For example, some dynamic language runtime 138 embodiments include a get-member-names 228 method to provide a list 230 of the names of dynamic members 210, a get-data-members 232 method to provide a list 230 of the names of all members 206, 210 of a dynamic object 132, and/or a get-dynamic-invocable-members 234 method to provide a list 230 of the names of dynamic object members 136 which require arguments passed by invocation to supply those members' current value(s) 216 to the debugger 126.

Figure 3:
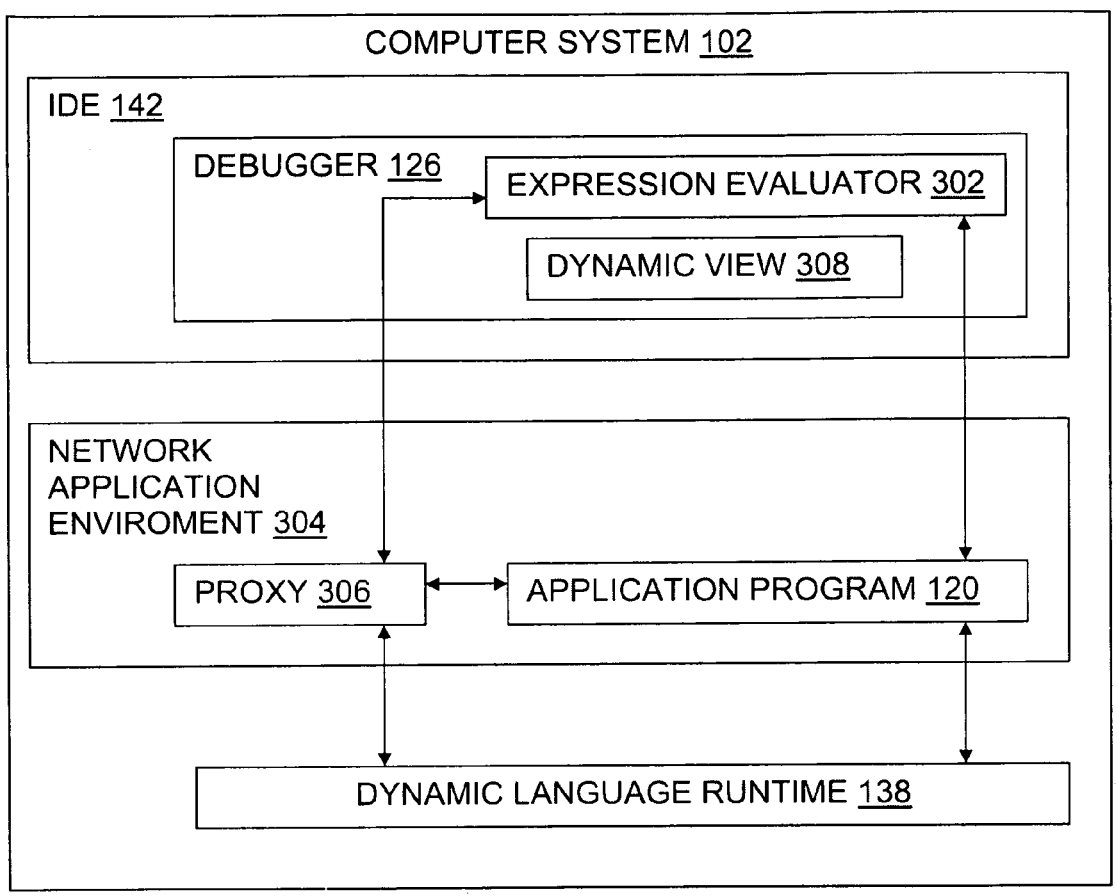
FIG. 3 block diagram further illustrating an architecture in which the debugger is part of an integrated development environment and the application being debugged runs in a network application environment.

FIG. 3 illustrates an architecture which is suitable for use with some embodiments. A debugger 126 within an integrated development environment 142 includes an expression evaluator 302; for example, the debugger may run inside a Microsoft Visual Studio® integrated development environment 142. An application program 120 being debugged runs within a network application environment 304; for example, the program 120 may run within a Microsoft .NET™ environment 304 (.NET is a mark of Microsoft Corporation). In the illustrated architecture, a proxy 306 also provides services within the network application environment 304. Communication can flow between the expression evaluator, application program, debugger, dynamic language runtime, and proxy, as indicated in the FIG. 3 example.

More specifically, some embodiments add a member node for a dynamic object in a debugger's Locals, Autos, and Watch windows 140. The added member node provides a dynamic view 308. To support the dynamic view, the expression evaluator 302 inspects the object in question to see if the object implements the IDynamicObject interface 222 anywhere across its inheritance hierarchy, and/or to see if the object is a COM object with type Sytem._ComObject, that is, a COM object without any static type information. If either of these conditions is true, the Dynamic View 308 is added for that object 132. The view 308 warns the user that expanding the view will retrieve all the dynamic members 210 and that any side effects involved in computing dynamic members might change the state of the object.

When the user expands the children of the Dynamic View 308 the expression evaluator 302 goes to the Dynamic Language Runtime (DLR) 138 and requests the member names by passing a "GetMemberNames" 228 operation. This operation returns a list 230 of the members available on the object 132. The expression evaluator 302 then performs a GetValue operation on each member and adds the members which produce a non-null value to the dynamic view 308. Familiarity with a dynamic language runtime, and the ability to access (and add if necessary) features supporting debugging for runtime type systems, is presumed in some embodiments.

Enough detail is generated for each child under the Dynamic View 308 to allow the child to be inspected outside of the dynamic view as watches, or to be included in ad hoc expressions.

Because each "step over" operation in the debugger 126 results in a re-evaluation of the watch window 140, in some embodiments any dynamic members 210 are made stale in the debugger, to prevent unwanted evaluation of the dynamic elements of the object 132. Each dynamic member 210 can be bought out of the stale state by clicking a refresh icon in the user interface 202.

In addition to inspection, some embodiments provide sufficient communication with the DLR to allow the user 104 to call methods, evaluate properties and use dynamic objects in expressions, and forward the behavior of operators to the alternate type system of the object. In some embodiments, the expression evaluator allows the user to create new dynamic objects as locals in the Immediate window 140. These locals are operated on in the same way as other dynamic objects 132 by using the DLR.

Some embodiments provide a computer system 102 which includes logical processor(s) 110 and memory(ies) 112. A debugger 126 configures memory in operable communication with the logical processor. A dynamic object 132 and a dynamic language runtime 138 configure memory in operable communication with the debugger. Some embodiments include a get-member-names 228 method, which is invocable within the debugger, and is designed to obtain from the dynamic language runtime a list 230 of names 214 of any dynamic member(s) 210 of the dynamic object. Some embodiments include a get-data-members 232 method, also invocable within the debugger, which is designed to obtain a list 230 of property names 214, property values 216, field names 214, and field values 216, if any, of the dynamic object. Properties and fields are examples of members 136. Some embodiments include a get-dynamic-invocable-members 234 method, invocable within the debugger, which is designed to obtain a list 230 of dynamic object property names and method names of respective properties and names, if any, which require argument(s) in invocation(s) for obtaining their respective property values and method values.

In some embodiments, the debugger 126 has a user interface 202, such as a graphical user interface with windows 140 tailored for debugging. In some situations, the dynamic object has at least one static member 206 and at least one dynamic member 210, and the user interface 202 configures the system 102 by displaying a name and a value for the static member and also displaying a name and a value for the dynamic member.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network in a browser-based collaborative environment. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

Figure 4:
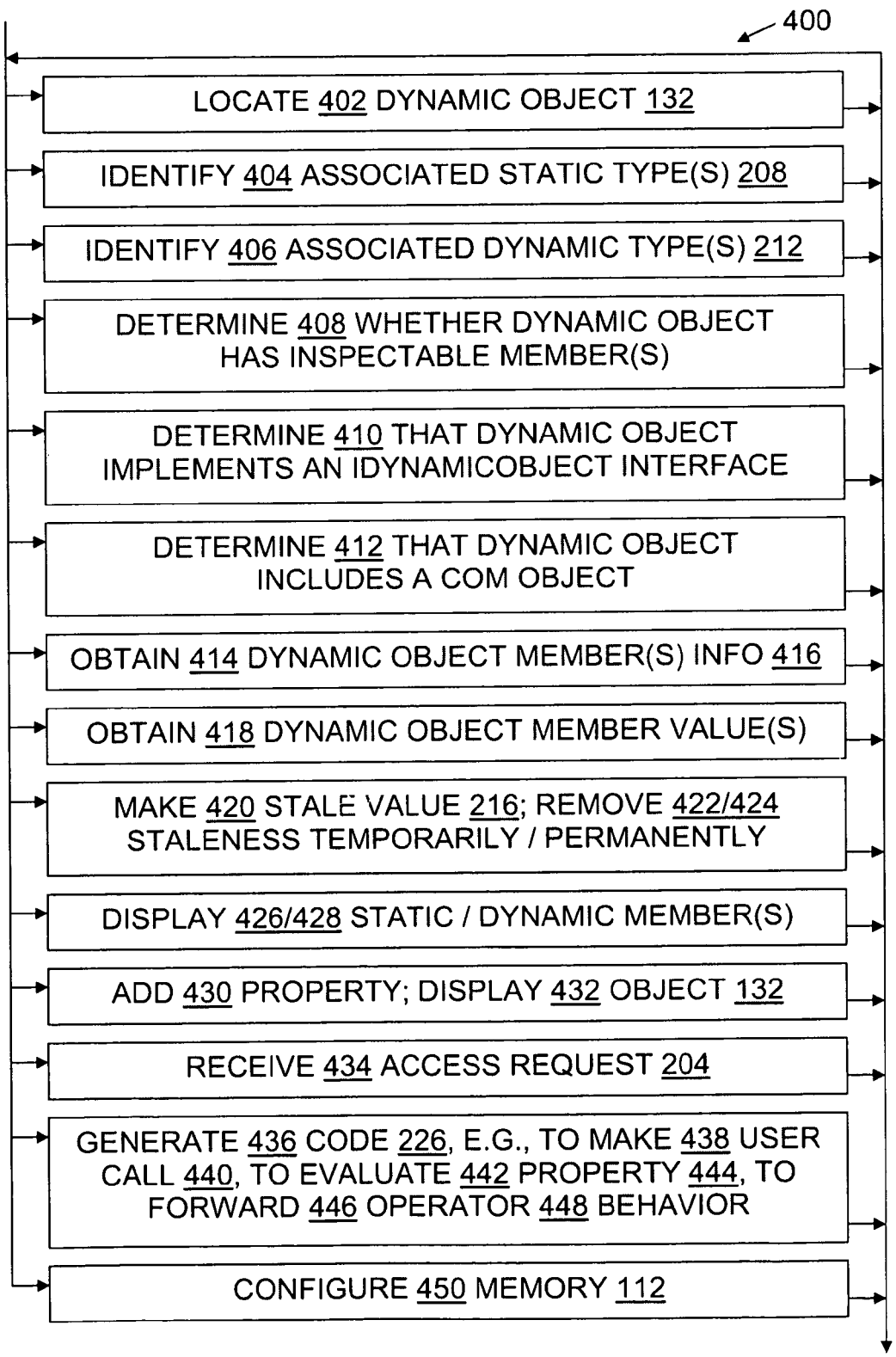
FIG. 4 is a flow chart illustrating steps of some method and configured storage medium embodiments.

FIG. 4 illustrates some method embodiments in a flowchart 400. Methods shown in the Figures may be performed in some embodiments automatically, e.g., by a debugger 126 or by an expression evaluator 302 operating outside a debugger, under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 4. Steps may be performed serially, in a partially overlapping manner, or fully in parallel. The order in which flowchart 400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a locating step 402, an embodiment locates a dynamic object 132. Step 402 may include performing a selection through a graphical user interface, a linked list traversal, a registry, a catalog, and/or another mechanism, for example, to select an object. Step 402 may also include checking a selected object to see if the object implements the IDynamicObject interface 222 anywhere across its inheritance hierarchy, and/or to see if the object is a COM object with type Sytem._ComObject, that is, a COM object without any static type information. If either of these conditions is true, the selected object is a dynamic object 132, and hence a dynamic object has been located.

During a static type identifying step 404, an embodiment identifies a static type associated with a dynamic object 132. A particular dynamic object may have only dynamic types, or it may have a mixture of static types and dynamic types. Step 404 may be accomplished using parsing, query interfaces, and other mechanisms that are also useful in debuggers which only recognize static types. In some embodiments, step 404 may also be accomplished using DLR features added to support debugging for runtime type systems, such as a get-member-names 228 method and/or a get-data-members 232 methods. Member static types may be provided by the DLR or other tools together with static member names, and in some situations member static types may be provided independently of member names.

During a dynamic type identifying step 406, an embodiment identifies a dynamic type associated with a dynamic object 132. Step 406 may be accomplished using added DLR features such as a get-member-names 228 method and/or a get-data-members 232 method, in some embodiments. Member dynamic types may be provided by the DLR together with dynamic member names, and in some situations member dynamic types may be provided independently of member names.

During an inspectable members determining step 408, an embodiment determines whether a dynamic object 132 has any inspectable members 136. Step 408 may be accomplished in some embodiments by calling a get-member-names 228 method which returns a list 230 of the members 136 available on the object 132. The embodiment then performs a GetValue operation on each member; the inspectable member(s) 136 are those having a non-null value 216.

During an IDynamicObject determining step 410, an embodiment determines that a dynamic object does have an implementation 220 of an IDynamicObject interface 222. IDynamicObject is an interface supported by Microsoft tools for the C#4 programming language. Step 410 may be accomplished using familiar tools for checking hierarchies for the presence of particular interface implementations.

During a COM object determining step 412, an embodiment determines that a dynamic object does have a COM object 218 component. COM refers to the Component Object Model interface standard for software components developed by Microsoft. Step 412 may be accomplished using GUIDs (globally unique identifiers) and other familiar tools for checking hierarchies for the presence of particular interface implementations.

During a dynamic object member information obtaining step 414, an embodiment obtains information about one or more members 136 of a dynamic object 132. Info 416 obtained may include, for example, whether a member has static type or dynamic type, a member's specific type, a member's name, a member's last known value, a member's current value upon being evaluated, and/or a parameter list 230 for an invocation (if required) to evaluate a member's current value. Step 408 may be accomplished in some embodiments by calling a get-member-names 228 method, a GetValue operation, a get-data-members 232 method, and/or a get-dynamic-invocable-members 234 method, for example, some or all of which may be added to a DLR to help support debugging for runtime type systems.

During a dynamic object member value obtaining step 418, an embodiment obtains value(s) of one or more members of a dynamic object 132. Value(s) 216 may be obtained, for example, in some embodiments by calling a get-member-names 228 method, a GetValue operation, a get-data-members 232 method, and/or a get-dynamic-invocable-members 234 method.

During a making stale step 420, an embodiment makes stale a value 216 of a dynamic object's member, thereby reducing the risk of unintended side effects caused by evaluating the member while stepping through the program 120 containing the object 132 during debugging. Step 420 may be accomplished by diverting, to a debugger-local copy of the last known value of the member, any debugger user attempts to access the member.

During a temporary staleness removal step 422, an embodiment temporarily removes an object member value from the stale state created in making stale step 420, by evaluating the member's current value 216 for use in debugging. Side effects, if any, of the evaluation are allowed to occur. Step 422 may be performed in response to a user pressing a "refresh" icon associated with the member in a user interface 202, for example. After the evaluation, further attempts to access the member are again diverted, pursuant to making stale step 420; the staleness removal is thus temporary.

During a permanent staleness removal step 424, an embodiment removes an object member value from the stale state created in making stale step 420, by evaluating the member's current value 216 for use in debugging. Step 424 also makes the removal from staleness permanent, by terminating the diversion of access attempts which was put in place by making stale step 420. Side effects, if any, of the evaluation are allowed to occur. After the evaluation, further attempts to access the member are not diverted, unless and until making stale step 420 is again performed.

During a static member displaying step 426, information of a static member 206 of a dynamic object 132 is displayed in a debugger interface 202, e.g., by displaying the member's name 214, value 216, and/or static type 208 in a debugger window 140. Some embodiments display 426 only the member's name and value, and some display 426 only the member's name and type, for example.

During a dynamic member displaying step 428, information of a dynamic member 210 of a dynamic object 132 is displayed in a debugger interface 202, e.g., by displaying the member's name 214, value 216, and/or dynamic type 212 in a debugger window 140. Some embodiments display 428 only the member's name and value, and some display 428 only the member's name and type. The value(s) displayed 428 may be stale value(s) and/or current value(s) after user-requested evaluation, for example.

During a property adding step 430, an embodiment adds a property as a member of a dynamic object 132. For a dynamic object in an IronPython program, for example, adding 430 a property can be accomplished by assigning the property a value. In some embodiments, property adding step 430 can be performed in an expression evaluator 302 using operations such as obj.ProName=value, Create propname. Step 430 can be accomplished by creating a call site for setting a property value and passing the property name and value as arguments. In some embodiments, the updated object 132 is then displayed 432 in the dynamic view 308.

During a request receiving step 434, an embodiment receives an access request 204. For instance, a request 204 may seek information 416 about member(s) 136 of a dynamic object, request a user call to a method of a dynamic object, request evaluation of a property of a dynamic object, or forward operator behavior to a dynamic object. Access requests 204 may be received through a graphical user interface or another interface 202.

During a code generating step 436, an embodiment generates code 226 to perform a requested operation accessing a dynamic object. Code 226 may be generated by a lightweight codegen 224, for example, to make 438 a user call 440 to a method of a dynamic object, to evaluate 442 (with any side-effects) a property 444, or to forward 446 behavior of an operator 448.

In some embodiments, the Dynamic Language Runtime 138 and codegen 224 support user calls 440 to dynamic object methods as follows while debugging. When a user types obj.Identifier(arg1, arg2) in the watch/quick-watch/immediate window 140, the expression evaluator 302 checks if the obj implements IDynamicObject, or is a COM object with no managed Primary interop assembly (is represented by System._ComObject), or is declared to have a dynamic type. In any of these cases, the expression evaluator 302 recognizes that the call 440 can not be made using the static type system and needs to be made using the runtime binding. Accordingly, the expression evaluator 302 packages information about the call, such as: the object on which the call is being made, in this case "obj"; the method name, in this case "Identifier"; the arguments, in this case "arg1, arg2"; and a set of bit flags that define properties of the arguments, such as whether they are constants.

In such embodiments, the call information is passed to a C# expression evaluator 302 debugging proxy 306; the debugging proxy class is packaged in Csharp.Microsoft.com. The debugger proxy 306 and other tools then do the following things. First, the proxy uses the type of the call (method, operator, Get or Set Property, etc.) and the arguments of the call to decide the signature of the delegate needed to communicate with the DLR. Second, the proxy generates this delegate using a lightweight codegen 224. Third, the codegen is used to create a call site using this generated delegate and Csharp runtime binders. Fourth, the codegen is used to emit the invocation of the call site. Fifth, the code 226 generated is executed. On receiving the call, the DLR will pass it to the dynamic provider of this object, which will try and bind the "identifier" to a method name that takes two arguments, in this example. If such a method is found then the call is executed and the results are returned. If no such method exists then the call is passed to the Csharp runtime binder to see if it can bind the call; this is useful for the cases when the dynamic object is a .Net type but is declared to be dynamic.

In such embodiments, the result of the call is sent back to the expression evaluator 302. On getting a binding exception, the expression evaluator will show the exception to the user. On getting a valid result, the expression evaluator might take a few more decisions to unbox the object, in case the return is a value type, as all dynamic calls return objects.

In some embodiments, the DLR and codegen support evaluating dynamic object properties while debugging in a similar manner to the foregoing support for making user calls, but with a different call site for the property. Similarly, in some embodiments, the DLR and codegen support forwarding the behavior of operators to the dynamic type of a dynamic object in a similar manner to the foregoing support for making user calls, but with a different call site for the operation. As examples of a dynamic operator, consider

```
Obj.Property + 10
Obj.Method(arg1, arg2) * obj.Property
``` where "Obj" is a dynamic object. The first example is rewritten in step 436 to:

```
OperatorCallSite(GetMembercallsite(obj, "Property" ), "Add", 10)
``` or similar code 226. The second example is rewritten to:

```
OperatorCallSite( MethodCallSite(obj, "Method", new
object[ ]{ arg1, arg2}), "Multiply", GetMemberCallSite
(Obj, "Property"))
``` or similar code 226. Rewritten examples are generated in the debugger proxy based on the payload sent from the expression evaluator.

During a memory configuring step 450, a memory 112 is configured by code 226, a window displaying both static and dynamic members of a dynamic object 132, a DLR feature such as methods 228, 232, 234 or their resulting list(s) 230, an access request 204, a debugger configured to operate as described in foregoing steps, and/or otherwise in connection with a dynamic object and debugging for runtime systems as discussed herein.

The foregoing steps and their interrelationships are discussed in greater detail below, in connection with various embodiments.

Some embodiments provide a method for facilitating software development. The method includes locating 402 within a debugger a dynamic object of a program which is being debugged; identifying 404 within the debugger a static type associated with the dynamic object; identifying 406 within the debugger a dynamic type which is also associated with the dynamic object; and determining 408 whether the dynamic object has at least one inspectable member. In some embodiments, the determining step 408 determines 410 that the dynamic object implements an IDynamicObject interface. In some embodiments, the determining step 408 determines 412 that the dynamic object includes a COM object which lacks static type information. In some embodiments, the determining step 408 obtains 414 a list 230 of members from a dynamic language runtime. In some embodiments, the determining step 408 determines that the dynamic object has at least one inspectable member, and the embodiment obtains 418 within the debugger a value for at least one inspectable member of the dynamic object.

Some embodiments make 420 within the debugger a stale value which is a copy of the value of an inspectable member of the dynamic object. Some embodiments then display 428/432 the stale value in a watch window 140 of the debugger after a step-over operation. Sometimes an embodiment subsequently removes 422 the member temporarily from staleness by updating the member value once in response to one corresponding command from a user; sometimes an embodiment removes 424 the member permanently from staleness by allowing repeated updates of the member value in response to repeated step-over operations.

Some embodiments display 426 at least one static member of the dynamic object and simultaneously display 428 at least one dynamic member of the dynamic object.

Some embodiments use an expression evaluator of the debugger while adding 430 a property to the dynamic object, and then display 432 the dynamic object with the added property in a window of the debugger.

Some embodiments include locating 402 a dynamic object of a program which is being debugged, identifying 404, 406 associated static and dynamic types, receiving 434 a dynamic object access request, and then generating 436 code in response to the access request. For example, some embodiments generate 436 code to support making 438 a user call to a method of the dynamic object. Some embodiments generate 436 code to support evaluating 442 a property of the dynamic object. Some embodiments generate 436 code to support forwarding 446 a behavior of an operator.

Some embodiments display 426 only static member(s) of the dynamic object, in a debugger user interface. Some embodiments display 428 only dynamic member(s), and some simultaneously display 426, 428 both the static member(s) and the dynamic member(s) of a dynamic object.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as expression evaluators 302, access requests 204, and code 226, in the form of data 118 and instructions 116, read from a removable medium 114 and/or another source such as a network connection, to form a configured medium. The configured memory 112 is capable of causing a computer system to perform method steps for transforming internal machinery of dynamic objects into usable displays for debugging as disclosed herein. FIGS. 1 through 7 thus help illustrate configured storage media embodiments and method embodiments, as well as system and method embodiments. In particular, any of the method steps illustrated in FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

With respect to inspection of objects, and Microsoft NET environment types, in some embodiments variables which are statically-typed as dynamic and which reference .NET types will be properly displayed by the expression evaluator using their runtime type. For example, consider:

```
dynamic d = new System.Collections.Generic.List<int>( );
```

When displayed by the expression evaluator, the runtime type of "d" (List<int>) will be used.

With respect to inspection of objects, and IDynamicObject types, in some embodiments the expression evaluator by default will display the static view of an IDynamicObject, for at least two reasons. First, C# debugging has always been a very statically-typed experience. Fully introducing dynamically-typed objects into the debugging experience could create an inconsistent experience and potentially cause user confusion. Second, IDynamicObject objects must be queried at debug-time to determine what members are available for display and what values they hold.

In addition to the static view, in some embodiments the expression evaluator will add a special node for IDynamicObject objects named "Dynamic View", reminiscent perhaps of the "Results View" node that was added for LINQ debugging. In some embodiments, the "Dynamic View" node has the following behavior. Expanding the Dynamic View node will query the IDynamicObject object for the members available for display and get the value for each. The children of the Dynamic View are immutable. Choosing "Add to Watch" for any child of the Dynamic View inserts a new watch that casts the object to dynamic (i.e. ((dynamic)obj).Name). The Dynamic View and its children are assumed to be side-effecting, and therefore stepping in the debugger will not automatically re-evaluate the Dynamic View or its children; they are made stale. The Dynamic View and/or its children will need to be manually refreshed by the user. A "dynamic" format specifier has been added to the expression evaluator. This allows the Dynamic View to be added to the watch by suffixing expressions with ", dynamic" as illustrated in FIG. 5.

With regard to COM Objects, in some embodiments, in addition to supporting IDynamicObject objects, the Dynamic View adds value to the experience of debugging COM objects. If the expression evaluator encounters a COM object wrapped in the generic runtime callable wrapper (a proxy through which the Microsoft Common Language Runtime exposes COM objects) (System._ComObject) it will add a Dynamic View node for the object, leveraging the DLR to dynamically inspect the members of the COM object.

In some embodiments, objects typed as "dynamic" are implemented as type "System.Object" with an attribute to indicate that the object is dynamic. In response to this implementation, a program database file payload has been added for local variables typed in some way as dynamic; the program database file holds debugging and project state information that allows incremental linking of the debug configuration of the program. The payload includes the name of the local, its slot ID and a boolean array (length<=128) that represents a pre-order traversal of the type. For example, consider:

```
Dictionary<int, dynamic> dict = new Dictionary<int, dynamic>( );
```

This code will produce a boolean array of false, false, true to indicate the portion of the type that is dynamic.

Figure 6:
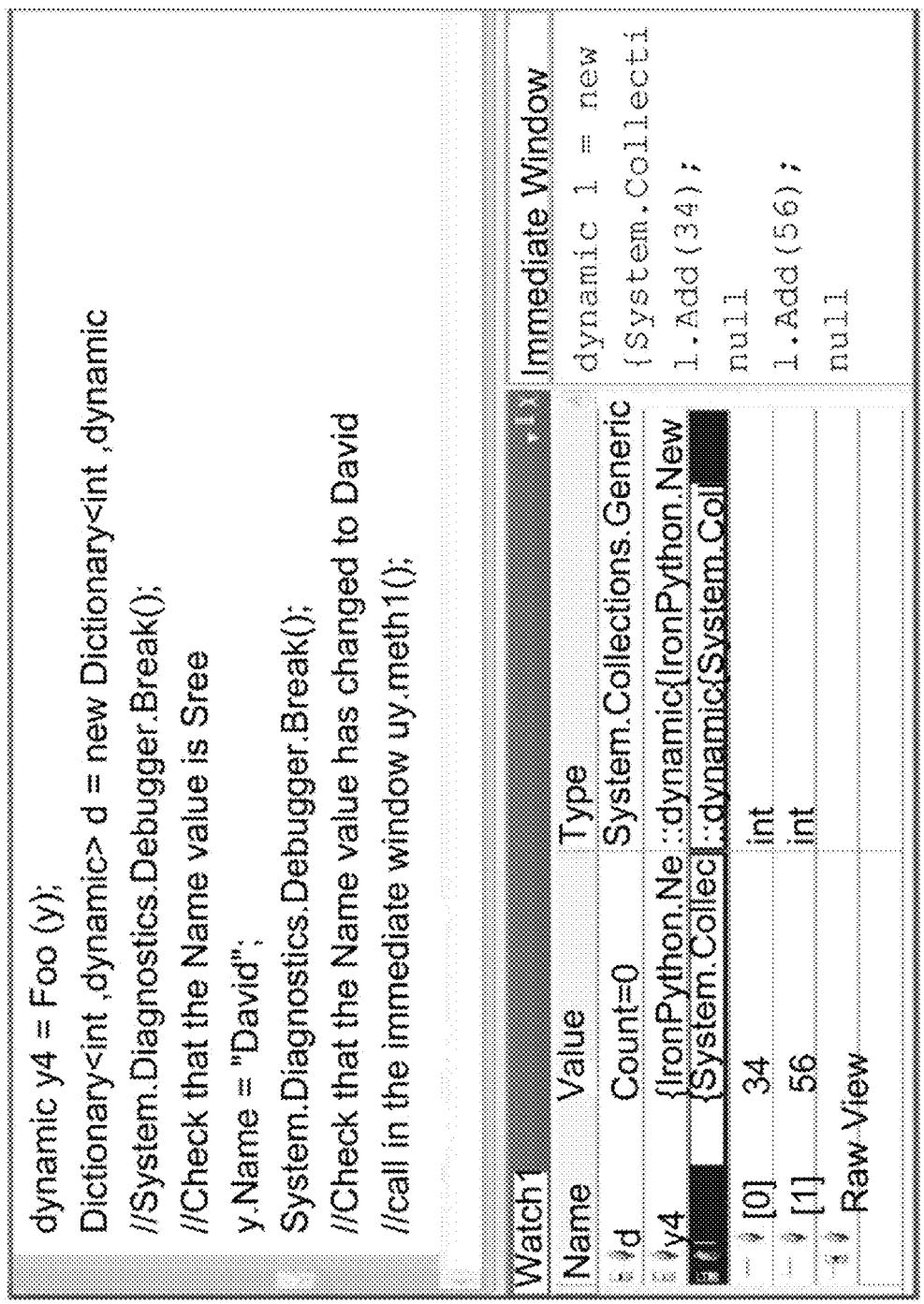
FIG. 6 is a sample screen shot illustrating declaration of dynamic variables within a debugger Immediate window.

With regard to declaration (as opposed to inspection), in some embodiments, declaration of dynamic variables within an Immediate window 140 is supported, including complex generic types (e.g. Dictionary<int, List<dynamic>>). An example is illustrated in FIG. 6.

With regard to evaluation, in some embodiments the expression evaluator 302 can evaluate many constructs on dynamic objects. Evaluation can impact operations with dynamic objects in conditional breakpoints, watches and the immediate window 140.

As to method calls, in some embodiments method calls with up to two arguments are supported. The number of arguments supported can vary by embodiment, but will have some arbitrary ceiling.

As to property getters, in some embodiments property getters of up to two arguments can be evaluated. An example is illustrated in FIG. 7. As with method calls, the number of arguments can be increased but has some implementation-dependent upper limit.

As to property setters, in some embodiments property setters of zero arguments can be evaluated by the expression evaluator 302.

As to operators, in some embodiments all unary operators are supported: ++, --, !, ~, +, -; all relational operators are supported: ==, !=, >=, <=; all arithmetic operators are supported: +, -, %, /, *; and the following logical operators are supported: |, &, ^, true, false, !.

In some embodiments, casting objects to and from dynamic is supported for IDynamicObject objects.

In some embodiments, if an object is typed in a watch window 140 or hovered over in an editing window 140 of the debugger, then both the static and dynamic members are displayed. If the user types in the object and a format specifier called "dynamic" like obj, only dynamic members are displayed.

In some embodiments, several features are not supported but are not necessarily ruled out as potential enhancements. Such unsupported features include the following: compound operators (i.e. +=, -=, %=, /=, *=); numeric casts and type argument casts. In some embodiments, property setters with arguments cannot be evaluated, so any indexer cannot be assigned to. Also, calling static methods or constructors with dynamic arguments is not supported in some embodiments, due to a lack of location off which to hang a call site. Calling any methods with ref or out parameters is not supported, in some embodiments. Named arguments are not supported for COM objects in some embodiments.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 4 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method of facilitating software development, the method comprising the steps of:
    locating within a debugger a dynamic object of a program which is being debugged;
    identifying within the debugger a static type associated with the dynamic object;
    identifying within the debugger a dynamic type which is also associated with the dynamic object;
    determining that the dynamic object has at least one inspectable member;
    obtaining within the debugger a value for at least one inspectable member of the dynamic object;
    making within the debugger a stale value which is a copy of the value of the inspectable member of the dynamic object;
    displaying the stale value in a watch window of the debugger after a step-over operation; and
    performing at least one of the following steps: removing the member temporarily from staleness by updating the member value once in response to one corresponding command from a user, removing the member permanently from staleness by allowing repeated updates of the member value in response to repeated step-over operations.

2. The method of claim 1, wherein the determining step comprises determining that the dynamic object implements an IDynamicObject interface.

3. The method of claim 1, wherein the determining step comprises determining that the dynamic object includes a COM object which lacks static type information.

4. The method of claim 1, wherein the determining step comprises obtaining a list of members from a dynamic language runtime.

5. The method of claim 1, wherein the method further comprises simultaneously displaying at least one static member of the dynamic object and at least one dynamic member of the dynamic object.

6. The method of claim 1, wherein the method further comprises using an expression evaluator of the debugger while adding a property to the dynamic object, and displaying the dynamic object with the added property in a window of the debugger.

7. A computer-readable memory configured with data and instructions for performing a method of facilitating software development, the method comprising the steps of:
    identifying within a debugger a static type associated with a dynamic object;
    identifying within the debugger a dynamic type which is also associated with the dynamic object;
    receiving in the debugger a dynamic object access request regarding the dynamic object;
    generating code in response to the access request;
    determining that the dynamic object has at least one inspectable member;
    obtaining within the debugger a value for at least one inspectable member of the dynamic object;
    making within the debugger a stale value which is a copy of the value of the inspectable member of the dynamic object;
    displaying the stale value in a watch window of the debugger after a step-over operation; and
    performing at least one of the following steps: removing the member temporarily from staleness by updating the member value once in response to one corresponding command from a user, removing the member permanently from staleness by allowing repeated updates of the member value in response to repeated step-over operations.

8. The configured memory of claim 7, wherein the generating step generates code to support making a user call to a method of the dynamic object during debugging.

9. The configured memory of claim 7, wherein the generating step generates code to support evaluating a property of the dynamic object during debugging.

10. The configured memory of claim 7, wherein the generating step generates code to support forwarding a behavior of an operator to the dynamic type of the dynamic object during debugging.

11. The configured memory of claim 7, wherein the method further comprises at least one of the following:
    determining that the dynamic object implements an IDynamicObject interface;
    determining that the dynamic object includes a COM object which lacks static type information;
    determining that the dynamic object is declared dynamic.

12. The configured memory of claim 7, wherein the method further comprises at least one of the following steps:

displaying only static member(s) of the dynamic object, in a debugger user interface;

displaying static member(s) of the dynamic object and also displaying dynamic member(s) of the dynamic object, in a debugger user interface;

displaying only dynamic member(s) of the dynamic object, in a debugger user interface.

13. The configured memory of claim 7, wherein the method further comprises obtaining a list of members from a dynamic language runtime.

14. The configured memory of claim 7, wherein the method further comprises simultaneously displaying at least one static member of the dynamic object and at least one dynamic member of the dynamic object.

15. The configured memory of claim 7, wherein the method further comprises using an expression evaluator of the debugger while adding a property to the dynamic object, and displaying the dynamic object with the added property in a window of the debugger.

16. A computer system comprising:
   a logical processor;
   a debugger configuring memory in operable communication with the logical processor;
   a dynamic object configuring memory in operable communication with the debugger;
   a dynamic language runtime configuring memory in operable communication with the debugger; and
   a get-member-names method invocable within the debugger and designed to obtain from the dynamic language runtime for the debugger a list of names, if any, of dynamic member(s) of the dynamic object;
   code configuring the memory which will upon execution perform the following:
      determine that the dynamic object has at least one inspectable member, obtain within the debugger a value for at least one inspectable member of the dynamic object, make within the debugger a stale value which is a copy of the value of the inspectable member of the dynamic object, display the stale value in a watch window of the debugger after a step-over operation; and also perform at least one of the following: remove the member temporarily from staleness by updating the member value once in response to one corresponding command from a user, remove the member permanently from staleness by allowing repeated updates of the member value in response to repeated step-over operations.

17. The system of claim 16, further comprising a get-data-members method invocable within the debugger and designed to obtain for the debugger a list of property names, property values, field names, and field values, if any, of the dynamic object.

18. The system of claim 16, further comprising a get-dynamic-invocable-members method invocable within the debugger and designed to obtain for the debugger a list of dynamic object property names and method names, if any, which require argument(s) in invocation(s) for obtaining respective property values and method values.

19. The system of claim 16, wherein the debugger comprises a user interface, the dynamic object comprises at least one static member and at least one dynamic member, and the user interface displays a name and a value for the static member and also displays a name and a value for the dynamic member.

20. The system of claim 16, wherein the dynamic object comprises at least one of the following: an IDynamicObject interface implementation, a COM object, a .NET object with a static type configured as dynamic.

* * * * *